Figure 1:
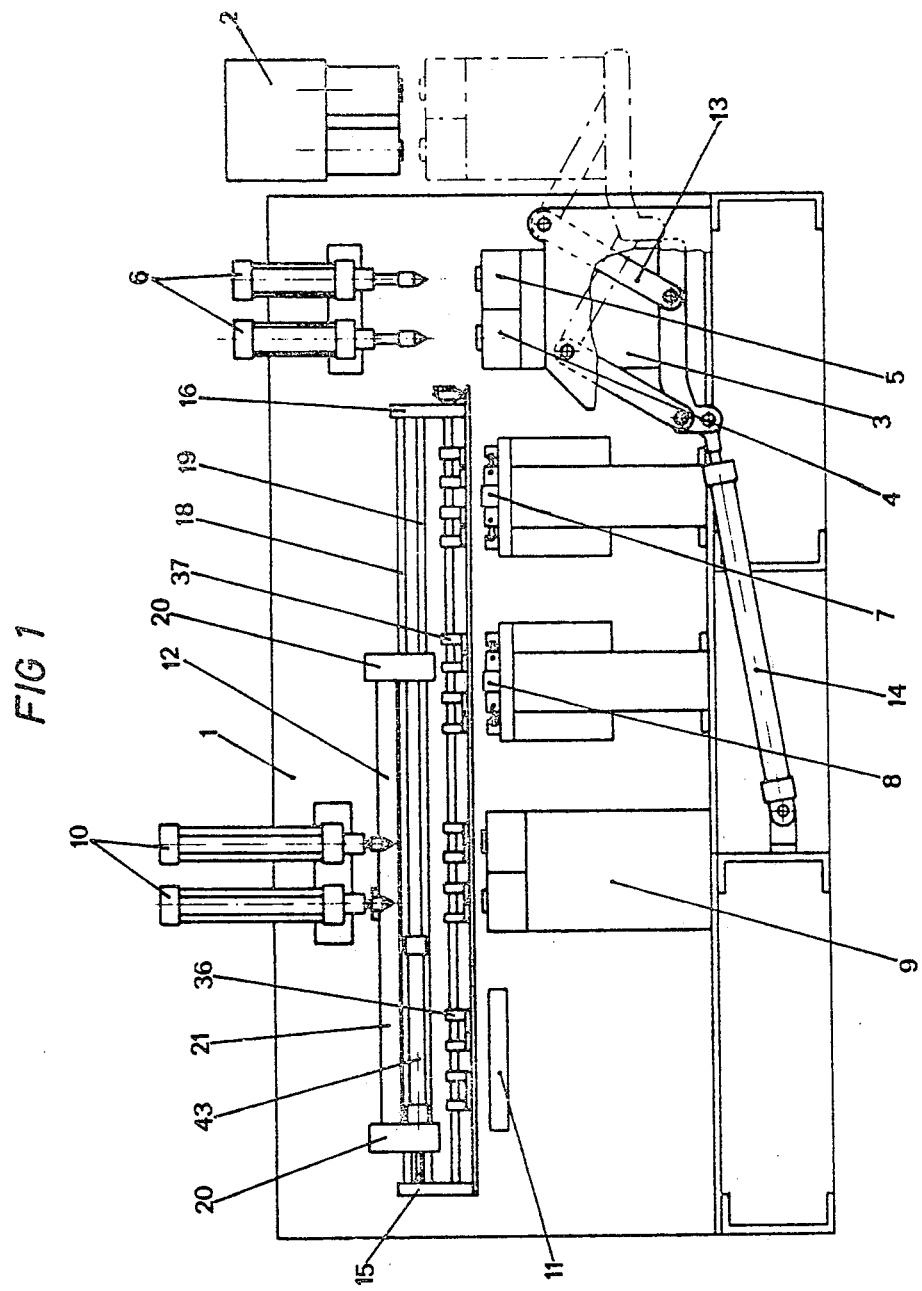

United States Patent [19]

Michel et al.

[11] 4,120,634

[45] Oct. 17, 1978

[54] APPARATUS FOR THE CONTINUOUS PRODUCTION OF ORIENTED HOLLOW BODIES FROM A THERMOPLASTIC

[75] Inventors: Edmond Michel, Brussels; Marcel Duikers, La Hulpe; André Poty, Lillois-Witterzee, all of Belgium

[73] Assignee: Solvay & Cie., Brussels, Belgium

[21] Appl. No.: 774,657

[22] Filed: Mar. 4, 1977

[30] Foreign Application Priority Data

Mar. 22, 1976 [FR] France .................. 76 08421

[51] Int. Cl.² ........................................... B29D 23/03
[52] U.S. Cl. .................................. 425/525; 425/532; 425/534
[58] Field of Search ............... 425/534, 522, 525, 532, 425/528

[56] References Cited

U.S. PATENT DOCUMENTS

| 3,940,225 | 2/1976 | Uhlig | 425/534 X |
| 3,978,184 | 8/1976 | Dybala et al. | 425/534 X |

Primary Examiner—Richard B. Lazarus
Attorney, Agent, or Firm—Spencer & Kaye

[57] ABSTRACT

The invention concerns an apparatus for the continuous production of oriented hollow bodies from a thermoplastic by blow extrusion which comprises a device for the extrusion of at least one continuous tubular parison from the thermoplastic and also comprises (1) at least one station for blow-molding preforms which is capable of receiving at least one preform mold which can seize a length of extruded parison while leaving open one end of this length which protrudes beyond the mold, and which is equipped with at least one blow nozzle which can be introduced into the open and protruding end of the length of parison so as to permit the production of preforms provided with a definitive molded neck (2) at least one fixed station for the heat-conditioning of the preforms to their orientation temperature and (3) at least one fixed station for the final blow-molding of the conditioned preforms equipped with at least one blow nozzle and at least one final blow-mold of which the cavity reproduces the shape of the desired oriented hollow bodies in which the transfer of the preforms from one of these station to the others is ensured by gripping means mounted on a movable equipment which act on the part of the preforms located above their neck and which move so as to disengage the preforms from the successive station, transfer them to the next station and engage them in this station.

12 Claims, 20 Drawing Figures

APPARATUS FOR THE CONTINUOUS PRODUCTION OF ORIENTED HOLLOW BODIES FROM A THERMOPLASTIC

The present invention relates to an apparatus for the continuous production of oriented hollow bodies from a thermoplastic by blow-extrusion in accordance with the technique which comprises the production, by blow-moulding, of a preform which possesses a definitive moulded neck, the heat-conditioning of this preform at a temperature favouring molecular orientation by stretching, and the blow-moulding of the desired oriented hollow body from this conditioned preform.

Processes and apparatuses which apply a similar technique are already known.

Thus, French patent application No. 73/40,992 filed on Nov. 16, 1973 in the name of G. MEHNERT and issued as French Pat. No. 2,207,008, and corresponding British Pat. No. 1,418,800, describe an apparatus comprising a preform mould which is displaceable between a feed position under an extrusion head and a moulding position under a blow nozzle, and a fixed final blowing mould. The transfer of the preform from the preform mould to the final blowing mould is effected by the final blowing nozzle which moves between these two moulds. This technique, which makes it possible to restrict the deformations in the area of the necks of the moulded hollow bodies can however not be exploited for the production of oriented hollow bodies by a technique which involves an intermediate stage of heat-conditioning the preforms to their optimum orientation temperature before the final blowing stage. In effect, the final blowing nozzle must be capable of being brought rapidly back to the preform mould so as to ensure the moulding of successive preforms and hence there is not sufficient time available to provide the conditioning treatment.

In order to overcome this disadvantage it is possible, according to French patent application No. 72/00,043 filed on Jan. 3, 1972 by OWENS ILLINOIS INC. and issued as French Pat. No. 2,121,541, and corresponding U.S. Pat. Nos. 3,767,747 and 3,940,225, to use moulding units which each comprise a preform mould and a final blowing mould which can be moved under two fixed blowing nozzles, one of which ensures the moulding of the preform and the other the final moulding. In such an apparatus, the possibility of heat-conditioning the preforms is still very restricted because the conditioning is principally effected during the residence time of the preform in the preform mould, the residence time itself being a function of the speed of extrusion of the initial tubular parisons. Accordingly it is desirable to choose the thickness of the extruded parison and the various heat conditioning parameters as a function of this rate of extrusion so as to achieve the desired degree of orientation. The operation of such an apparatus is thus necessarily very sensitive and any variation in rate of production results in difficulties in regulating the apparatus. Finally, since the duration of heat conditioning of the preforms is short, it is never possible to achieve a uniform temperature over the entire thickness of the wall of the preform, and this adversely affects the production of oriented hollow bodies of high quality.

It thus follows that it has hitherto not proved possible to perfect a simple and continuous apparatus for the production of oriented hollow bodies which can guarantee perfect heat conditioning of the intermediate preforms.

The applicant company has now filled this want by producing the apparatus which forms the subject of the invention.

The present invention thus relates to an apparatus for the continuous production of oriented hollow bodies from a thermoplastic by blow-extrusion, which comprises a device for the extrusion of at least one continuous tubular parison from the thermoplastic and also comprises (1) at least one station for blow-moulding preforms, which is capable of receiving at least one preform mould which can seize a length of extruded parison whilst leaving open one end of this length which protrudes beyond the mould, and which is equipped with at least one blow nozzle which can be introduced into the open and protruding end of the length of parison so as to permit the production of preforms provided with a definitive moulded neck, (2) at least one fixed station for the heat conditioning of the preforms to their orientation temperature and (3) at least one fixed station for the final blow-moulding of the conditioned preforms, equipped with at least one blow nozzle and at least one final blow mould of which the cavity reproduces the shape of the desired oriented hollow bodies, in which apparatus the transfer of the preforms from one of these stations to the other is ensured by gripping organs which act on the part of the preforms located above their neck and which move so as to disengage the preforms from the successive stations, transfer them to the next station and engage them in this station.

In a preferred embodiment of the invention, the station for moulding the preforms is also fixed. Again preferably, the fixed stations for moulding the preforms, for heat conditioning the preforms and for the final moulding are aligned, preferably in a straight line, and are equidistant from one another. In this case, the means of gripping can be mounted on one and the same device and can move simultaneously with it. The distance which separates the gripping organs provided on the movable device is thus equal to the distance which separates the successive stations and their number is equal to the number of stations. The translational movements of the movable equipment are such that each of the gripping organs moves between two successive stations by executing a reciprocating movement.

In the position corresponding to the end of the stroke, the movable equipment occupies a position such that the gripping organs are opposite a station but are retracted relative to the latter.

To accomplish each movement of transferring the preforms between two successive stations, the movable equipment causes a forward movement of the gripping organs in a direction substantially at right angles to the alignment of the stations, followed by a transverse movement along the direction of this alignment and finally a retracting movement of the gripping organs in the opposite direction from the forward movement.

The return of the movable equipment to its initial position is achieved by a transverse movement in the opposite direction to that which causes the transfer of the preforms.

According to a preferred sub-variant of an embodiment, the apparatus according to the invention possesses two series of stations for moulding the preforms, heat conditioning the preforms and final moulding of the conditioned preforms, these series being located in a line on either side of the device for extruding the tubular parison, each series being alternately fed by at least one length of tubular parison delivered by the extrusion device. In this case, the apparatus can also comprise two movable equipments located on either side of the extrusion device, these two equipments hence functioning in alternate sequences as presented above.

The translational movements of the movable equipment can advantageously be controlled by means of hydraulic or pneumatic jacks controlled by a programme or by micro-switches.

The gripping organs advantageously consist of pincers with articulated jaws. Preferably, the faces of the jaws intended to come into contact with the thermoplastic are not plane but provided with a relief so as to imprint a relief in the thermoplastic — which is still hot — at the time at which the preforms are extracted from the preform mould. These faces are preferably striated. The opening and closing of these pincers can also be controlled by a programme or by micro-switches and can be brought about by means of hydraulic or pneumatic jacks.

The gripping organs are so arranged that they seize the preforms at the portion of the parison located beyond their neck which is moulded to its definitive shape in the preform mould.

At the time of seizing the preform which is in the preform mould, for the purpose of transferring it to the conditioning station, the pincers with articulated jaws which constitute the gripping organ can collaborate with the blow nozzle of the preform which has been inserted into the open end of the preform. For this purpose, the jaws define between themselves, when in the closed position, a cylindrical space of slightly smaller diameter than that of the tubular parison. As a result, the plastic material, which is still hot, present between the nozzle and the pincers is crushed at the same time as the relief provided on the jaws becomes imprinted into the external wall of the preform. The relief thus imprinted permits self-centering of the preforms when they are subsequently seized by other gripping organs with which the movable equipment is provided. The height of the jaws is not critical; it is in general approximately equal to that of the part of the length of tubular parison which protrudes beyond the preform mould, that is to say about 2 to 20 mm.

According to another preferred sub-variant of an embodiment, the preform mould consists of two half-moulds which can be separated, and is able to travel, by a reciprocating movement, between two positions, one being under the extrusion head which delivers the continuous tubular parison and the other under the nozzle for blowing the preforms, at the fixed station for moulding the preforms.

The preform mould is in the open position under the extrusion head and closes under the latter so as to trap a portion of tubular parison which is severed, by a cutting organ, from the continuous parison which is delivered. The cutting organ is so arranged that a part of the length of parison trapped by the mould protrudes beyond the latter for a length of about 10 to 20 mm, this part being subsequently used by the gripping organs of the movable equipment in order to carry out the transfer operations.

The travel of the preform mould can be controlled by a lever system or by guide ramps, so as to keep the mould parallel to itself during this travel.

The moulded preform preferably has a hemispherical base and a substantially cylindrical body. The length is preferably less than the height of the final hollow body desired and the diameter is only slightly greater than that of the starting tubular parison.

The preform which has been blow-moulded is furthermore provided with a definitive moulded neck which can optionally be surmounted by a false neck, which has also been moulded, and which can be utilized during the subsequent deflashing of the neck of the final hollow body. This false neck can be provided with grooves which ensure its correct positioning during deflashing and guide the blade which effects the cutting-off operation.

In the course of moulding the preforms by blowing, it is advantageous also to deflash their base by equipping the blow mould of the preforms with a suitable deflashing device. A device of this type is described in French patent application No. 74/09,380 filed on Mar. 15, 1974 by the applicant company and its counterpart U.S. Pat. No. 4,049,761; it is particularly suitable for treating preforms which have a hemispherical base.

The preforms extracted from the preform mould by the gripping organs, after withdrawal of the blow nozzle, are transferred to the heat conditioning station. During their residence in this station, the preforms can be cooled or be reheated in accordance with a predetermined program so as to bring them progressively to the optimum temperature for the purpose of orientation by stretching during the final blowing. The heat conditioning station can consist of a mould identical to the preform mould and equipped with means of heat conditioning. In that case, a nozzle may be provided so as to permit internal conditioning by flushing with a suitable fluid. It is also possible to provide differences in temperature between the various parts of the preform (neck, body, base and so on), especially by providing several circuits through which the heat transfer fluid passes within the conditioning mould. The heat conditioning station can also simply comprise two metal plates which act on the neck of the preforms and hold them suspended in a conditioning chamber.

According to a preferred variant which makes it possible to lengthen the duration and hence the efficiency of the heat conditioning, it is possible to provide several fixed heat conditioning stations, preferably equidistant from one another, into which stations the preforms are transferred successively by means of the gripping organs. In the course of their residence in the last station, the preforms are preferably so treated as to allow their temperature to become uniform over the entire thickness of their wall.

Thereafter, the gripping organs transfer the preforms into the final blow mould, where they are brought to their definitive shape by means of a blow nozzle cooperating with this mould. The final blow mould can be of any type whatsoever.

According to a preferred variant, the blow nozzle is so designed as to exert a longitudinal stretching action on the preforms. This result can be achieved, for example, by providing a stretching piston which can slide in this nozzle.

Finally, the oriented hollow bodies thus produced are extracted from the final blow mould by means of the gripping organs and are transferred to a fixed location where they are released and can be recovered.

According to another variant, the oriented hollow bodies can be introduced by the gripping organs into a fixed station which serves to deflash their neck.

The apparatus according to the invention can furthermore be so designed as to be fed by means of an extrusion head which simultaneously delivers several parallel tubular parisons. Thus, if the use of an extrusion head which delivers two tubular parisons is envisaged, it suffices to double up the stations as well as the gripping organs.

The apparatus according to the invention is in addition explained in more detail in the description of a practical embodiment which now follows. However, this description is of course given by way of illustration and without implying a limitation.

Figure 2:
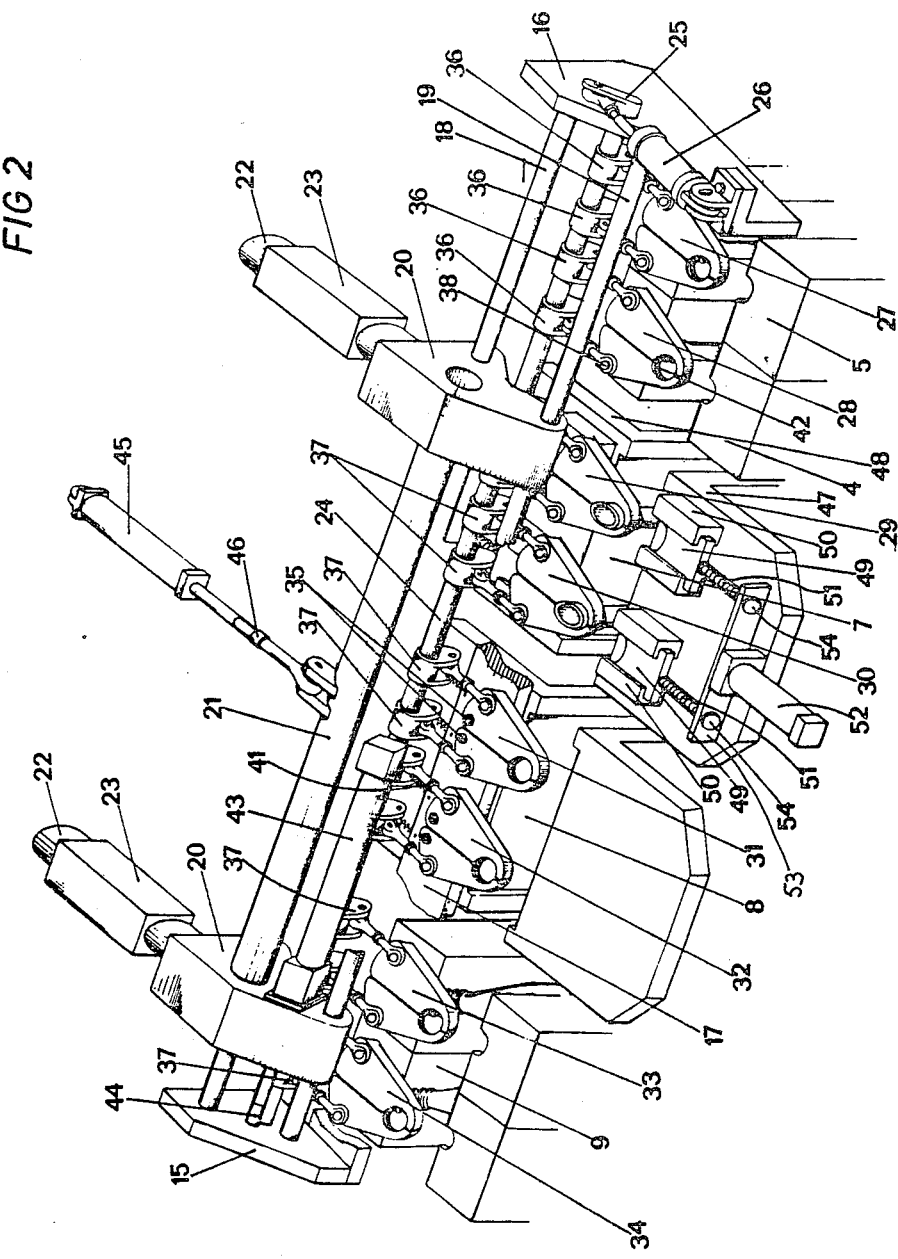

In this description, reference should be made to the figures of the attached drawings in which:

FIG. 1 is an elevation view of the left-hand part of an apparatus according to the invention, comprising two rows of stations on either side of the extrusion device, FIG. 2 is a perspective view showing the details of construction of the movable equipment provided on the apparatus of FIG. 1, FIGS. 3 to 6 are detail views and FIGS. 7 to 20 are diagrams which explain the functioning of the apparatus.

In the description, only the left-hand part of the apparatus will be detailed, it being understood, of course, that the right-hand part, which is not shown, is symmetrical relative to the left-hand part and functions symmetrically and alternately with the latter.

The left-hand part of the apparatus, which will henceforth be referred to as being the apparatus, consists (FIG. 1) of a fixed framework 1, located laterally relative to an extrusion head 2 which delivers two continuous tubular parisons and on which are mounted a preform moulding unit 3 which is movable and comprises two preform moulds 4, 5 located side by side, a fixed unit of two preform blowing nozzles 6, two fixed stations 7 and 8 for heat conditioning, a fixed final blowing station 9 equipped with blow nozzles 10, a fixed station 11 for deflashing the necks of the hollow bodies and a movable equipment 12.

The preform moulding unit 3, consisting of two separable preform moulds and their opening and closing mechanism, is mounted on a lever system 13 and can be moved, by means of a double-action hydraulic jack 14, between a feed position under the extrusion head, represented in broken lines in FIG. 1, and the preform moulding station under the nozzles 6, represented in solid lines in FIG. 1.

The stations for preform moulding, heat conditioning, final blowing and neck deflashing are arranged in a straight line and equidistant from one another.

The fixed station for final blowing comprises two final blow moulds arranged side by side, and their opening and closing mechanism.

The movable equipment consists, as emerges more clearly from FIG. 2, of two parallel side-plates 15, 16 linked by a crossbeam 17 which is partially shown, and by two guide bars 18, 19. These bars 18 and 19 can slide in two bearings 20 linked by a crossbeam 21 and supported by two guide columns 22 which can themselves slide in bearings 23.

An axle 24, which can revolve in bushes provided on the sideplates, is also located between the sideplates 15 and 16. To one end of this axle 24 is fixed a lever 25. A jack 26, mounted on the sideplates 16, can actuate the lever 25 and thus cause the axle 24 to revolve through a certain angle.

Pincers 27, 28, 29, 30, 31, 32, 33 and 34 are located on the crossbeam 17. These pincers consist of two jaws in each case articulated about an axle 35. To each of these jaws corresponds a lever 36–37 located on the axle 24 and joined to each jaw by a connecting rod 38.

Figure 6:
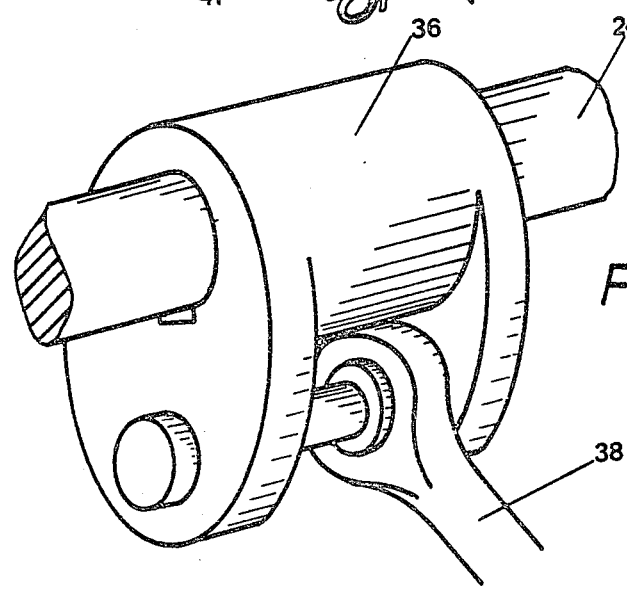

The levers 36 of the pincers 27 and 28 are keyed onto the axle 24 as can be seen from FIG. 6, so that when the axle 24 turns under the action of the jack 26, the pincers 27 and 28 forcibly open or close by means of the levers 36 and the connecting rods 38.

Figure 5:
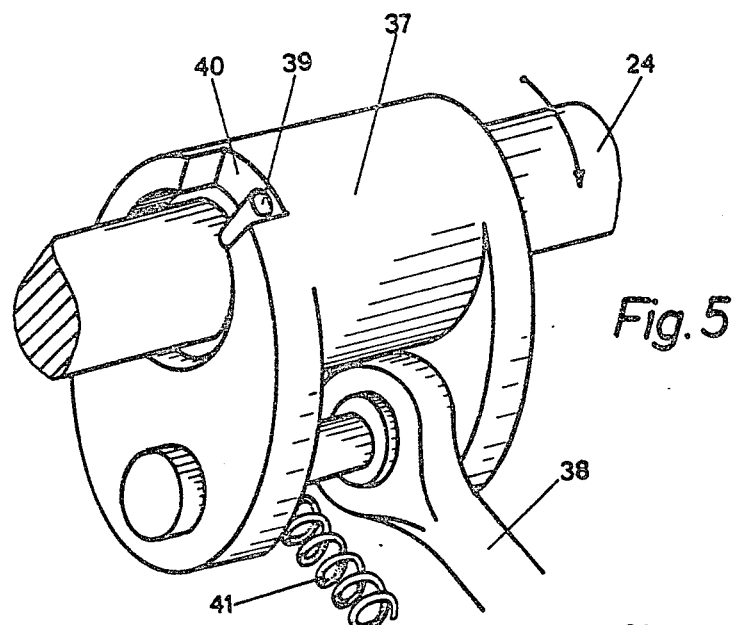

In contrast, the levers 37 of the pincers 29 to 34 are not keyed onto the axle 24. Furthermore, as is shown in FIG. 5, a pin 39 fixed to the axle 24 is engaged in a cut-out 40 provided on each lever 37. The dimensions of the cut-out 40 and the position of the latter relative to the pin 39 are such that the opening of the pincers 29 to 34 is positively controlled via the lever 37 and the connecting rod 38. Forced opening thus occurs under the action of the axle 24 and the jack 26. In contrast, when the axle 24 is actuated by the jack 36 so as to cause the pincers to close, the pin 39 merely moves in the cut-out 40 and the lever 37 is not called into play. Furthermore, a spring 41 links each lever 37 to the crossbeam 17 and controls the individual closing of the pincers 29 to 34.

The control of the closing of the pincers 27 and 28 is rendered positive because of the fact that these pincers must be capable of crushing the lengths of hot thermoplastic material which protrudes beyond the preform moulds 4 and 5 against the nozzle 6 so as to imprint into these lengths of thermoplastic the positioning relief 42 provided on their jaws.

In contrast, the closing of the pincers 29 to 34 is controlled individually by the springs 41, with which the pincers are provided in such a way that if these pincers cannot close completely, for any reason whatsoever, the others can nevertheless close and correctly perform their function.

A hydraulic jack 43 fixed to one of the bearings 20 can, via its rod 44 fixed to the sideplate 15, control the lateral travel of the movable equipment 12 between two adjacent stations.

Another hydraulic jack 45 is fixed to the framework 1 of the apparatus and its rod 46, fixed at the center of the crossbeam 21, permits the movable equipment to travel in directions perpendicular to the lateral travel.

The preform moulding station 3, heat conditioning stations 7 and 8, final blowing station 9 and deflashing station 11 are equidistant from one another and the movable equipment is so regulated that each travel of the equipment under the action of the jack 43 brings each group of pincers 27–28, 29–30, 31–32 and 33–34 opposite one station.

The heat conditioning stations 7 and 8 consist of two flanged plates 47 and 48, of which the flanges, as shown at station 7 of FIG. 2, are provided with small plates 49 which can slide in guides 50. The travel of these small plates 49 is controlled by a system comprising compression springs 51 and a controlled jack 52. The jack 52 causes the travel of the small plate 53 in which the guide rods 54 of the small plates 49 can slide. The compression springs 51 rest against the small plate 53 and against the small plates 49. As a result, the jack 52 can cause the small plates 49 to clamp elastically onto the preforms under the action of the springs 54. The plates 47 and 48 can be equipped with means of heat conditioning which are not shown.

Finally, the neck deflashing station 11 shown schematically in FIG. 1 can be of any type.

Figure 3:
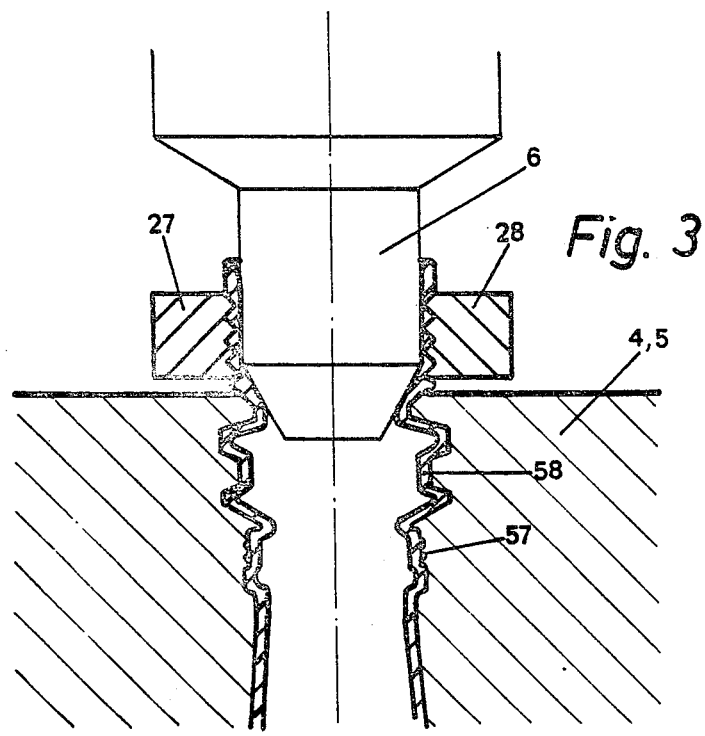
Figure 4:
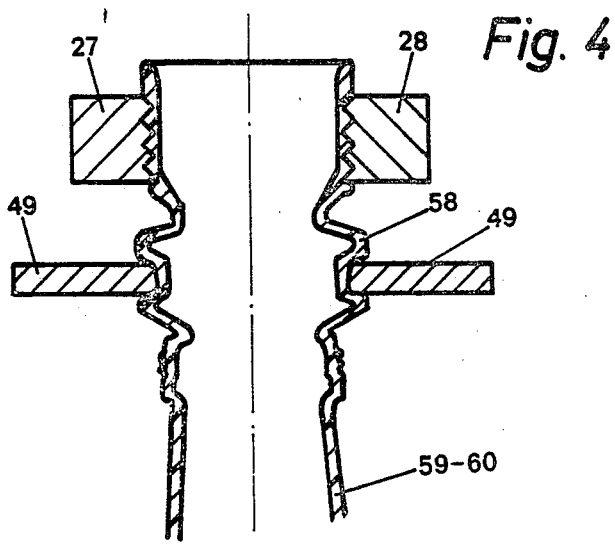

The mode of operation of the apparatus which has just been described is illustrated by FIGS. 3 and 4 and by FIGS. 7 to 20, the latter showing schematically the relative positions of the constituent elements of the apparatus during a complete functioning sequence.

Figure 7:
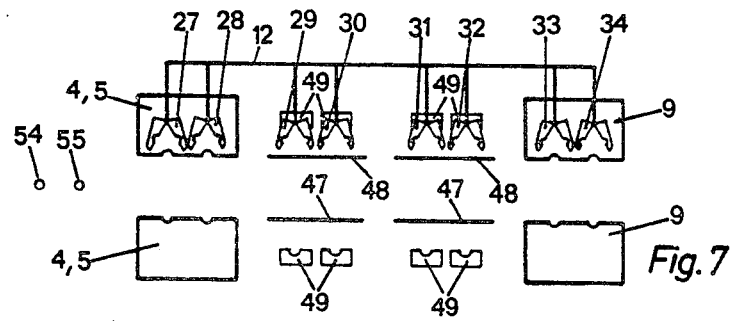

When starting up the apparatus, the preform moulds 4, 5 and the final blow moulds 9 are open, the small plates 49 are in the apart position and the movable equipment 12, of which all the pincers are open, is in a position such that the pincers 27-28 are in the withdrawn position and opposite the preform moulds, as is shown in FIG. 7.

Figure 8:
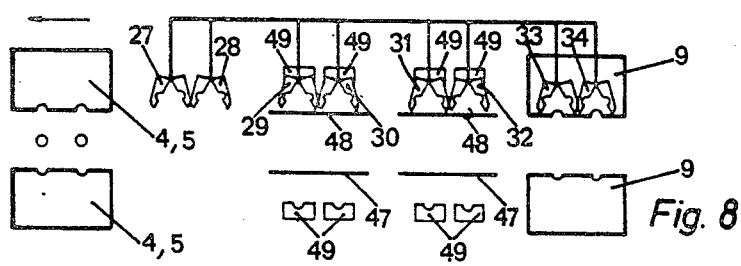
Figure 9:
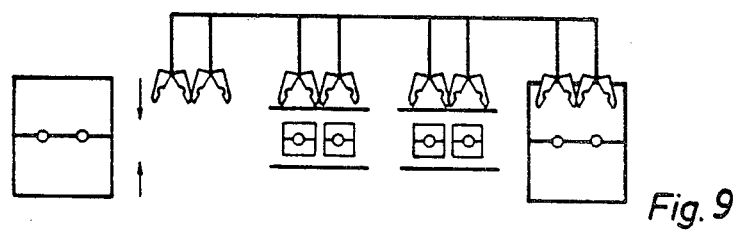

Once the apparatus has been started, the lever 13, under the action of the jack 14, brings the open preform moulds 4, 5 under the extrusion head 2 which continuously delivers the tubular parisons 54, 55 as is shown in FIG. 8.

Once the preform moulds have arrived under the extrusion head, their control mechanism causes them to close onto the parisons and a cutting device, which is not shown, severs the lengths of parison trapped in the moulds. This cut is so effected as to leave, at the top of the moulds, free portions of parison of 10 to 20 mm length. Simultaneously, the jacks 52 control the moving-together of the small plates 49 and the final blow mould 9 closes under the action of its control mechanism. At that instant, the apparatus is thus in the position illustrated in FIG. 9.

Figure 10:
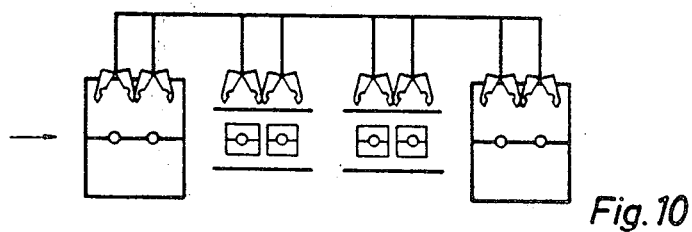

Thereafter, the preform moulds are brought to their starting position under the blow nozzle 6, by the action of the jack 14 and of the lever 13, as shown in FIG. 10.

Figure 11:
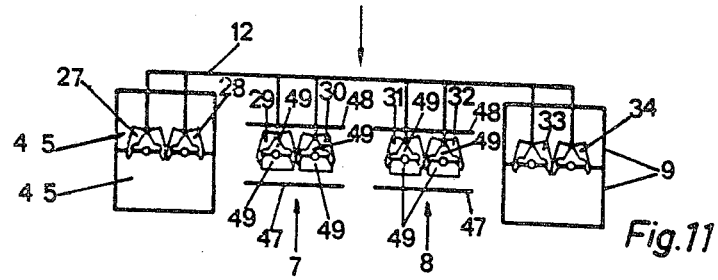

Once the preform moulds have returned to their starting position, the nozzles 6 are lowered and introduced into the protruding and open ends of the portions of parison trapped in these moulds, and the blow-moulding of the first two preforms can thus start. During this moulding, the movable equipment advances under the action of the jack 45 and the open pincers 27, 28 come to surround the nozzles 6 as is shown in FIG. 11.

Figure 12:
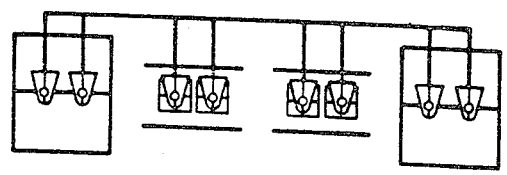

During the subsequent sequence, shown schematically in FIG. 12, the pincers of the movable equipment 12 close under the action of the jack 26 and, in particular, the pincers 27 and 28, the closing of which is forced, crush the end of the preforms between the cylindrical part of the nozzles 6 and the interior of the jaws of these pincers, as is shown in FIG. 3. As is shown in FIG. 3, the moulded preforms have a definitive neck 57 surmounted by a false neck 58. The pincers 27 and 28 as well as the nozzle 6 can be cooled so as rapidly to solidify the portion of parison in contact with them and render permanent the relief imprinted by the jaws of these pincers.

Figure 13:
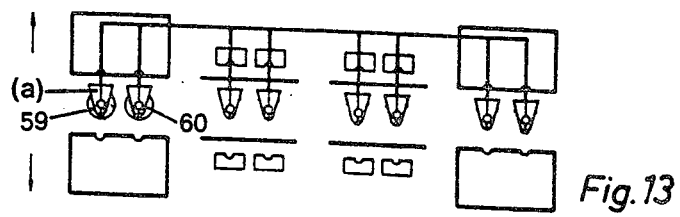

When the blow moulding of the preforms is finished, the nozzles 6 are brought back to the rest position and the preform moulds open, leaving the preforms 59-60 suspended in the pincers 27, 28, as shown in FIG. 13. At the same time, the small plates 49 are moved apart and the final blow mould 9 is open.

Figure 14:
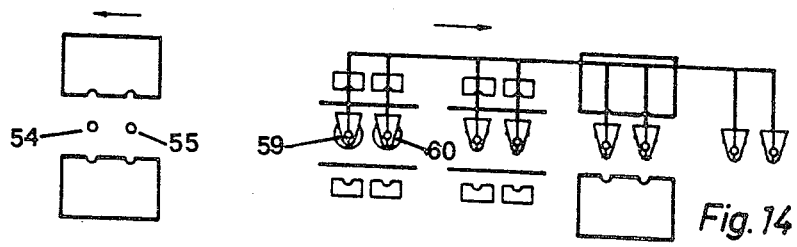

During the sequence which follows, as shown schematically in FIG. 14, the open preform moulds are brought under the extrusion head 2 by the action of the jack 14 and the movable equipment 12 travels transversely under the action of the jack 43 so as to bring the preforms 59-60 opposite the small plates 49 provided on the first heat conditioning station 7.

Figure 15:
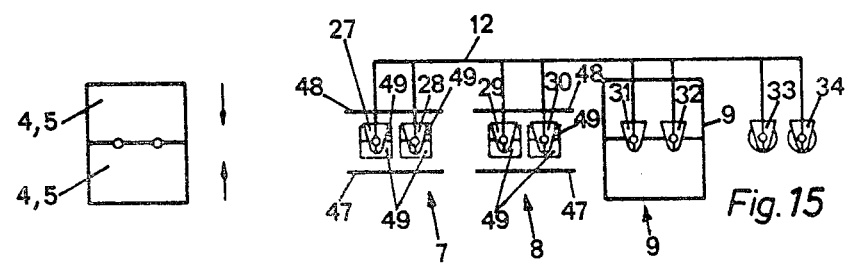
Figure 16:
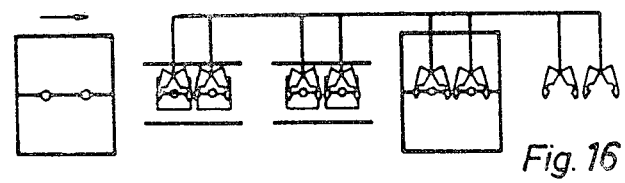

When the apparatus occupies a position which has just been described, the preform moulds close so as to trap new portions of tubular parisons as already described. The final blow mould also closes and the plates 49 come together under the action of the jack 52 and rest in the groove of the false neck 58 of the preforms 59-60, as shown in FIG. 4. The position occupied by the various devices at that instant is shown in FIG. 15.

Thereafter the preform moulds 4, 5 are brought by the lever 13 underneath the blow nozzles 6 and the pincers mounted on the movable equipment 12 open. As a result, the preforms 59-60 remain suspended solely by the small plates 49 of the first heat conditioning station 7. The end of this sequence is shown schematically in FIG. 16.

Figure 17:
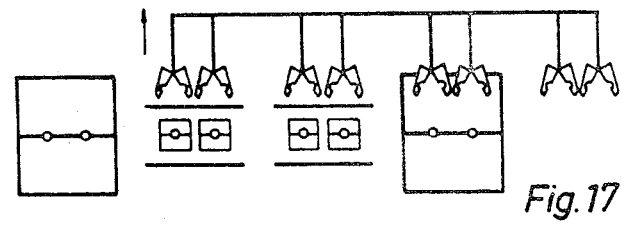
Figure 18:
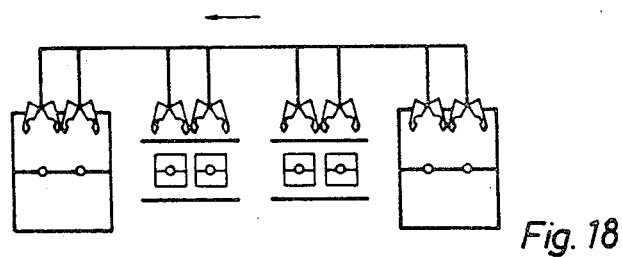

Whilst the nozzles 6 mould two new preforms, the movable equipment 12 is brought, under the action of the jack 45, into the retracted position as shown in FIG. 17 and then undergoes transverse travel, under the action of the jack 43, which brings the pincers 27, 28 back to a position opposite the preform moulds, as shown in FIG. 18.

Figure 19:
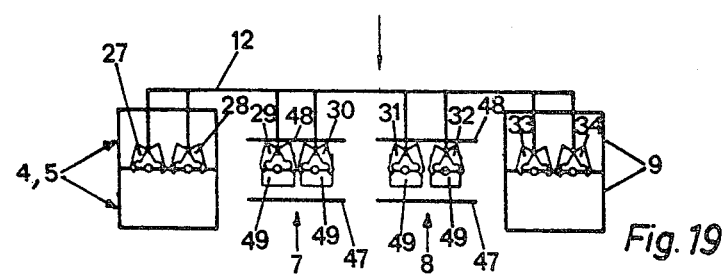
Figure 20:
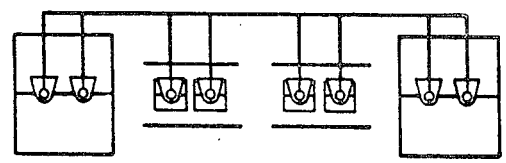

Thereafter, the movable equipment 12 is caused to travel forward under the action of the jack 45 and the pincers 27, 28 come to surround the nozzles 6 whilst the pincers 29 and 30 come to surround the preforms 59-60, in the part surmounting their false neck, as shown in FIG. 19, and thereafter these pincers close under the action of the jack 26, as shown in FIG. 20.

During this last sequence, the jaws of the pincers 27-28 imprint their relief into the new preforms moulded in the preform moulds and the pincers 29, 30 centre precisely on the preforms 59-60 because of the relief imprinted on the portion of these preforms provided for the purpose of being seized by these pincers. It should be recalled that if one of the pincers 29, 30 cannot close for any reason whatsoever, the other pincer can nevertheless correctly complete its work. The apparatus is then in the position illustrated in FIG. 20, which in fact is identical with that of FIG. 12.

The apparatus is thus again in a state where it can begin a new cycle during which the preforms 59-60 will be transferred to the second heat conditioning station 8 whilst the new preforms will be transferred to the first heat conditioning station 7. During the following cycle, the heat-conditioned preforms 59-60 will be engaged in the final blow moulds 9 where the nozzles 10 will convert them to oriented hollow bodies which, in the following cycle, will be transferred to the neck deflashing station 11. From that point onwards, the apparatus becomes productive and at each subsequent cycle delivers two deflashed oriented hollow bodies ready to be used. It should here be recalled that the apparatus possesses a symmetrical right-hand part which functions alternately with the left-hand part, so that the effective production per cycle is 4 oriented hollow bodies.

The apparatus according to the invention can advantageously be used to manufacture bioriented bottles from resins having a high acrylonitrile content, the bottles being used for packaging beer and other gaseous drinks.

We claim:

1. Apparatus for the continuous production of oriented hollow bodies from a thermoplastic by blow-extrusion, which comprises a means for the extrusion of at least one continuous tubular parison from the thermoplastic and also comprises (1) at least one first station provided with means for blow-moulding lengths of the tubular parison into preforms, and which receives at least one preform mould which seizes a length of extruded parison whilst leaving open one end of this length which protrudes beyond the mould, and at least one blow nozzle means which can be introduced into the open and protruding end of the length of parison so as to provide the preforms with a definitive moulded neck and a part located thereabove with the part of the preform below the neck being the part molded in the final blow molding means, (2) at least one fixed second station provided with means for the heat conditioning of the preforms to their orientation temperature and (3) at least one fixed third station provided with means for the final blow-moulding of the conditioned preforms into the finished bodies, equipped with at least one blow nozzle and at least one final blow mould of which the cavity reproduces the shape of the desired oriented hollow bodies, characterized in that the transfer of the preforms from one of these stations to the other is ensured by movable equipment and gripping organs mounted on the movable equipment, the gripping organs having means gripping the part of the preforms located above their neck and being moved by the movable equipment so as to disengage the preforms from the successive stations, transfer them to the next station and engage them in this station.

2. Apparatus according to claim 1, characterized in that said first station for blow-moulding the preforms is also fixed.

3. Apparatus according to claim 2, characterized in that the first, second and third stations are aligned.

4. Apparatus according to claim 3, characterized in that the first, second and third stations are aligned on a straight line and are equidistant from one another.

5. Apparatus according to claim 4, characterized in that the distance separating the gripping organs mounted on the movable equipment is equal to the distance separating the successive stations.

6. Apparatus according to claim 3, characterized in that in order to perform each movement of transfer of preforms between two successive stations, the movable equipment comprises means for effecting a forward movement of the gripping organs along a direction substantially at right angles to the alignment of the stations, followed by a transverse movement along the direction of this alignment and finally a movement of retracting the gripping organs in the opposite direction to the forward movement, these various movements being controlled by jacks.

7. Apparatus according to claim 1, characterized in that it comprises two series of first stations for blow-moulding the preforms, second stations for heat conditioning the preforms and third stations for final moulding of the conditioned performs, each series being arranged along a line at a respective side of the device for extrusion of the tubular parison, each series being fed alternately with at least one length of tubular parison delivered by the extrusion device.

8. Apparatus according to claim 1, characterized in that the gripping organs consist of pincers with articulated jaws.

9. Apparatus according to claim 8, characterized in that the jaws are provided with a relief.

10. Apparatus according to claim 1, characterized in that the preform mould consists of two half-moulds which are mounted to be separated and to travel by executing a reciprocating movement between two positions, one position being under the extrusion head which delivers the continuous parison and the other position being under the nozzles for blowing the performs.

11. Apparatus according to claim 10, characterized in that the preform mould is provided with a device for deflashing the base of the moulded preforms.

12. Apparatus according to claim 1, characterized in that it comprises a plurality of fixed second heat conditioning, stations, equidistant from one another.

* * * * *